US011105378B2

(12) United States Patent
Lee

(10) Patent No.: US 11,105,378 B2
(45) Date of Patent: Aug. 31, 2021

(54) WHEEL DRIVE UNIT FOR VEHICLE

(71) Applicant: HYUNDAI WIA Corporation, Changwon-si (KR)

(72) Inventor: Soo Kyoung Lee, Hwaseong-si (KR)

(73) Assignee: HYUNDAI WIA Corporation, Changwon-si (KR)

( * ) Notice: Subject to any disclaimer, the term of this patent is extended or adjusted under 35 U.S.C. 154(b) by 425 days.

(21) Appl. No.: 16/010,748

(22) Filed: Jun. 18, 2018

(65) Prior Publication Data
US 2018/0363711 A1 Dec. 20, 2018

(30) Foreign Application Priority Data
Jun. 19, 2017 (KR) .......................... 10-2017-0077407

(51) Int. Cl.
*F16D 3/223* (2011.01)
*F16D 3/226* (2006.01)
(Continued)

(52) U.S. Cl.
CPC ............ *F16D 3/223* (2013.01); *B60B 7/0013* (2013.01); *B60B 27/0042* (2013.01); *B60B 27/0094* (2013.01); *F16D 1/116* (2013.01); *F16D 3/226* (2013.01); *B60B 2900/541* (2013.01); *F16D 2001/103* (2013.01); *F16D 2003/22313* (2013.01); *Y10S 464/906* (2013.01); *Y10T 403/7033* (2015.01)

(58) Field of Classification Search
CPC .......... F16D 3/223; F16D 3/226; F16D 1/116; F16D 2001/103; F16D 2003/22313; B60B 27/0094; B60B 27/0042; B60B 7/0013; B60B 2900/541; B60B 35/127; Y10T 403/7033; Y10S 464/906
USPC ........................................................ 464/146
See application file for complete search history.

(56) References Cited

U.S. PATENT DOCUMENTS 4,047,822 A * 9/1977 Lehmann ............... F16B 5/0092
4,460,058 A * 7/1984 Welschof ............ B60B 27/0005
464/906
(Continued)

FOREIGN PATENT DOCUMENTS

DE 10 2006 034 035 A1 1/2008
EP 1 125 765 A2 8/2001
(Continued)

OTHER PUBLICATIONS

Universal Joint and Driveshaft Design Manual, AE-7, Society of Automotive Engineers, Inc., Warrendale, PA, pp. 145-150, TJ1079. S62 (Year: 1979).*
(Continued)

*Primary Examiner* — Greg Binda

(57) ABSTRACT

A wheel drive unit for a vehicle includes a connecting member separably coupled to a constant velocity joint, a hub housing accommodating the constant velocity joint, and a hub cap to seal the hub housing. In particular, a fixing groove is formed around a first end of the constant velocity joint, and the connecting member is fitted in the fixing groove in a ring shape. When the hub cap is separated from the hub housing, the connecting member can be easily disassembled from the constant velocity joint such that inner components of the wheel drive unit can be easily replaced and repaired.

7 Claims, 4 Drawing Sheets

(51) Int. Cl.
   *F16D 1/116*    (2006.01)
   *B60B 27/00*    (2006.01)
   *B60B 7/00*     (2006.01)
   *F16D 1/10*     (2006.01)

(56) References Cited

U.S. PATENT DOCUMENTS

| | | | |
|---|---|---|---|
| 6,739,978 B2 * | 5/2004 | Hacker | ................... B60B 27/00 |
| | | | 464/906 |
| 2002/0072421 A1 | 6/2002 | Ouchi | |
| 2007/0123357 A1 | 5/2007 | Hahn et al. | |

FOREIGN PATENT DOCUMENTS

| | | |
|---|---|---|
| EP | 1 375 196 A1 | 1/2004 |
| EP | 2 692 541 A1 | 2/2014 |
| JP | 2001-206004 A | 7/2001 |
| JP | 2008-094156 A | 4/2008 |
| JP | 2014-028580 A | 2/2014 |
| KR | 10-2002-0042940 A | 6/2002 |

OTHER PUBLICATIONS

European Search Report dated Dec. 14, 2018 from the corresponding European Application No. 18177147.8, 8 pp.

* cited by examiner

"RELATED ART"

WHEEL DRIVE UNIT FOR VEHICLE

CROSS REFERENCE TO RELATED APPLICATION

This application claims priority to and the benefit of Korean Patent Application No. 10-2017-0077407, filed Jun. 19, 2017, the entire contents of which are incorporated herein by reference.

FIELD

The present disclosure relates to a wheel drive unit for a vehicle and, more particularly, to a wheel drive unit for a vehicle wherein internal components of the wheel drive unit can be separated, replaced, or repaired when they are damaged.

BACKGROUND

The statements in this section merely provide background information related to the present disclosure and may not constitute prior art.

In general, an automotive powertrain is a system transmitting power from an engine to driving wheels, in which the power from the engine is converted in speed and torque and is then transmitted to a differential connected to an axle. Accordingly, the axle is rotated by the differential, and the driving wheels coupled to the end of the axle are rotated, thereby driving a vehicle.

In particular, a joint is coupled to a driving shaft for transmitting power and it is a part for transmitting power to rotary shafts arranged at different angles. A hook joint, a flexible joint etc. are used for a thrust shaft having a small power transmission angle and a constant velocity joint is used for the driving shaft having a large power transmission angle in front wheel drive vehicles.

The constant velocity joint, which is a part that is applied to a drive shaft of a front wheel drive vehicle, enables front wheels to be quickly driven without rotational imbalance even if the angle of power transmission is changed by steering the front wheels.

According to the coupling structure of a constant velocity joint of the related art, an inner race and a constant velocity shaft are axially fixed by a circlip. However, a hub housing in which a constant velocity joint is disposed is sealed to prevent leakage of grease out of the constant velocity joint. Since the hub housing is sealed, we have discovered that it is very difficult to take out the circlip when fixed with the inner race and the constant velocity shaft.

In particular, when excessive force applies to separate the constant velocity joint, components may be damaged and also the separating work is very difficult.

The foregoing is intended merely to aid in the understanding of the background of the present disclosure, and is not intended to mean that the present disclosure falls within the purview of the related art that is already known to those skilled in the art.

SUMMARY

The present disclosure provides a wheel drive unit for a vehicle, and the wheel drive unit enables a constant velocity joint of internal components to be easily separated for replacement and repair.

In one form of the present disclosure, a wheel drive unit for a vehicle includes: a connecting member separably coupled to a constant velocity joint and fixing a bearing to the constant velocity joint when mounted on the constant velocity joint; a hub housing having an inner space where the constant velocity joint is arranged and coupled with the hub housing by the bearing; and a hub cap separably disposed in the hub housing, and configured to seal the hub housing when coupled to the hub housing, and configured to allow the connecting member to be separated from or mounted on the constant velocity joint when the hub cap is separated from the hub housing.

A fixing groove may be formed around a first end of the constant velocity joint and the connecting member may be fitted in the fixing groove in a ring shape.

A bearing seat on which the bearing is mounted may be formed at an end portion of the constant velocity joint, the fixing groove may be formed at a first end of the bearing seat, and fixing protrusions may be formed around a second end of the bearing seat, so the bearing may be disposed and fixed between the connecting member and the fixing protrusions.

The bearing may be composed of an inner race fitted on the constant velocity joint, an outer race fitted on an inner side of the hub housing, and balls retained between the inner race and the outer race, and the inner race may be disposed between the connecting member and the fixing protrusions and may be axially fixed on the constant velocity joint.

The connecting member may be a snap ring having holes at both ends.

First threads may be formed around an inner side of the hub housing, and second threads may be formed on an outer side of the hub cap. The first threads and the second threads mate with each other to seal the inner space.

A straight fastening groove may be formed on an outer surface of the hub cap.

According to the drive wheel unit for a vehicle which has the structure described above, since the inside of the hub housing can be opened and closed, the constant velocity joint of the internal parts of the wheel drive unit can be separated if desired. As the constant velocity joint can be replaced and repaired in this way, continuous maintenance is possible and durability can be secured.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
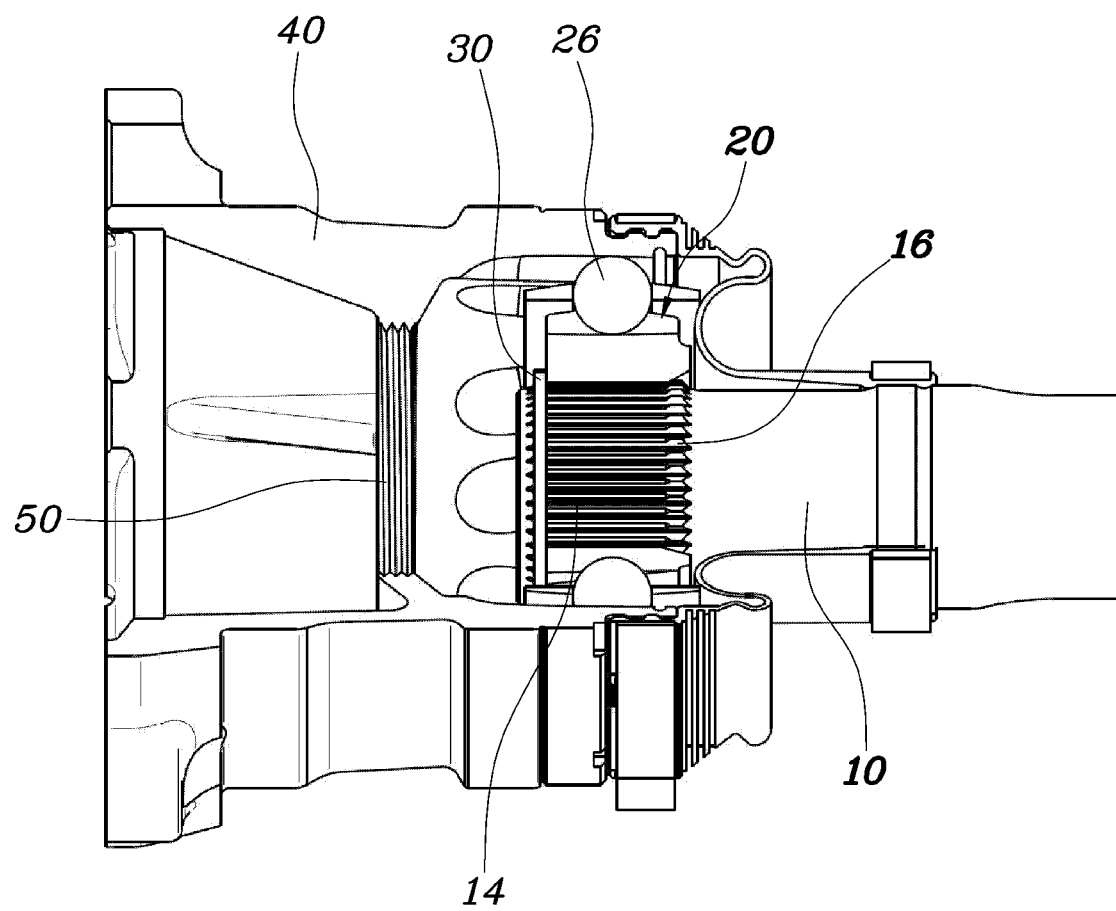
FIG. 1 is a view showing a wheel drive unit for a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
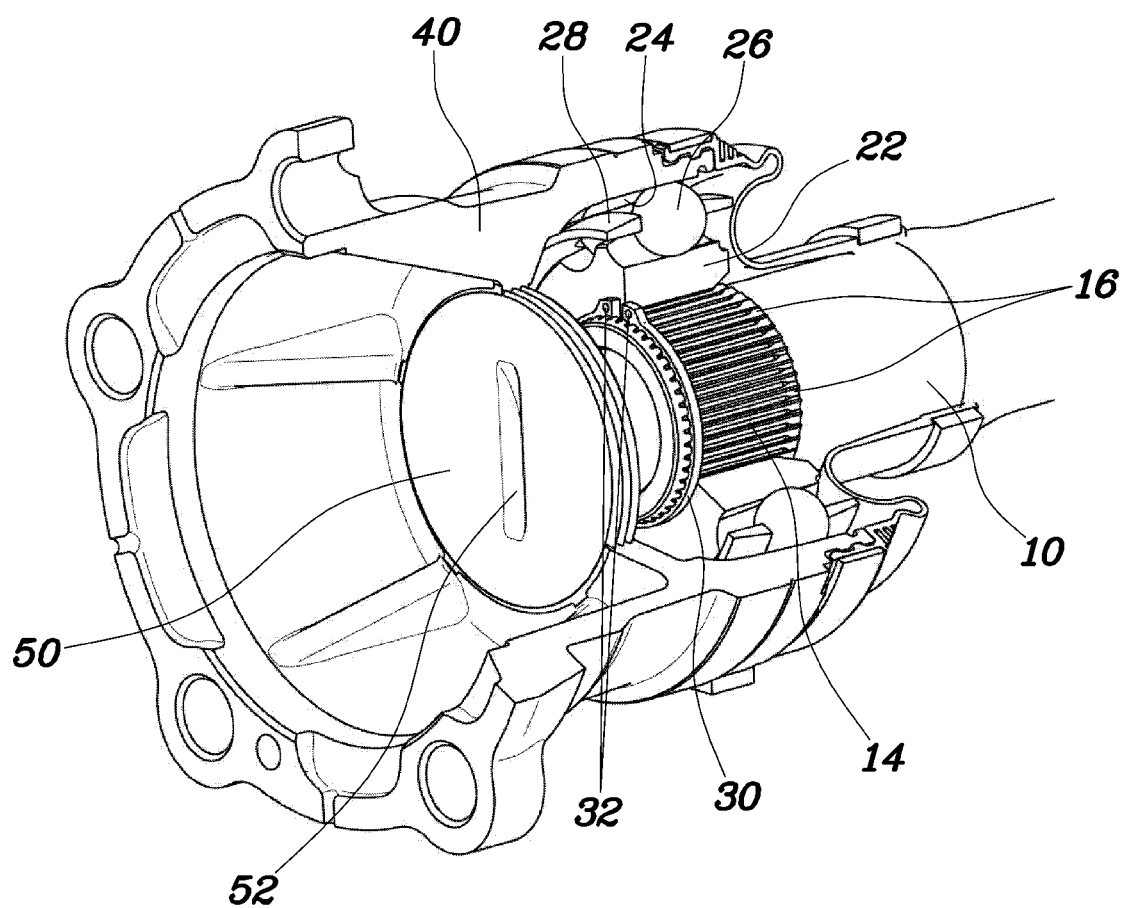
FIGS. 2 and 3 are views illustrating the wheel drive unit for a vehicle shown in FIG. 1.
Figure 3:
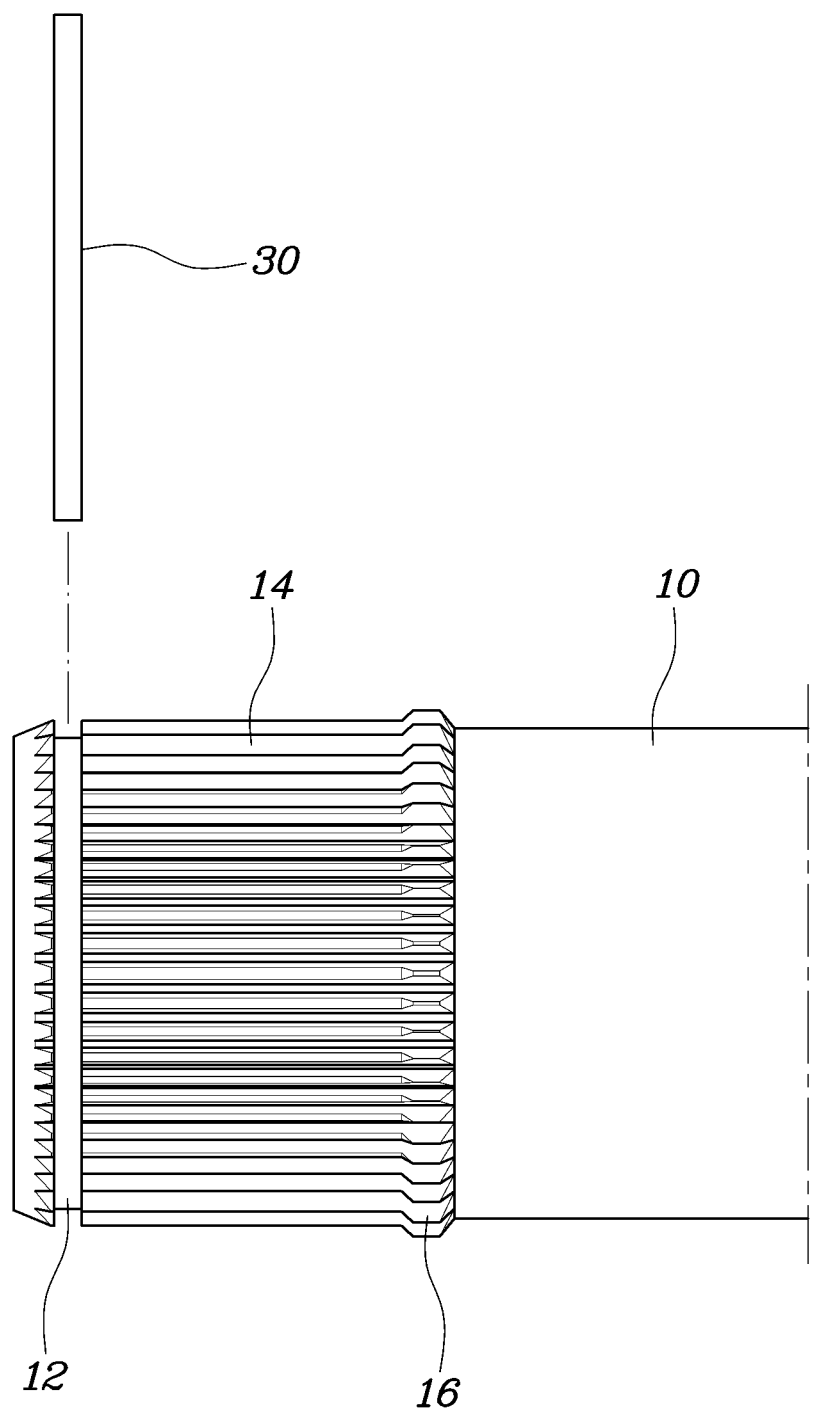
Figure 4:
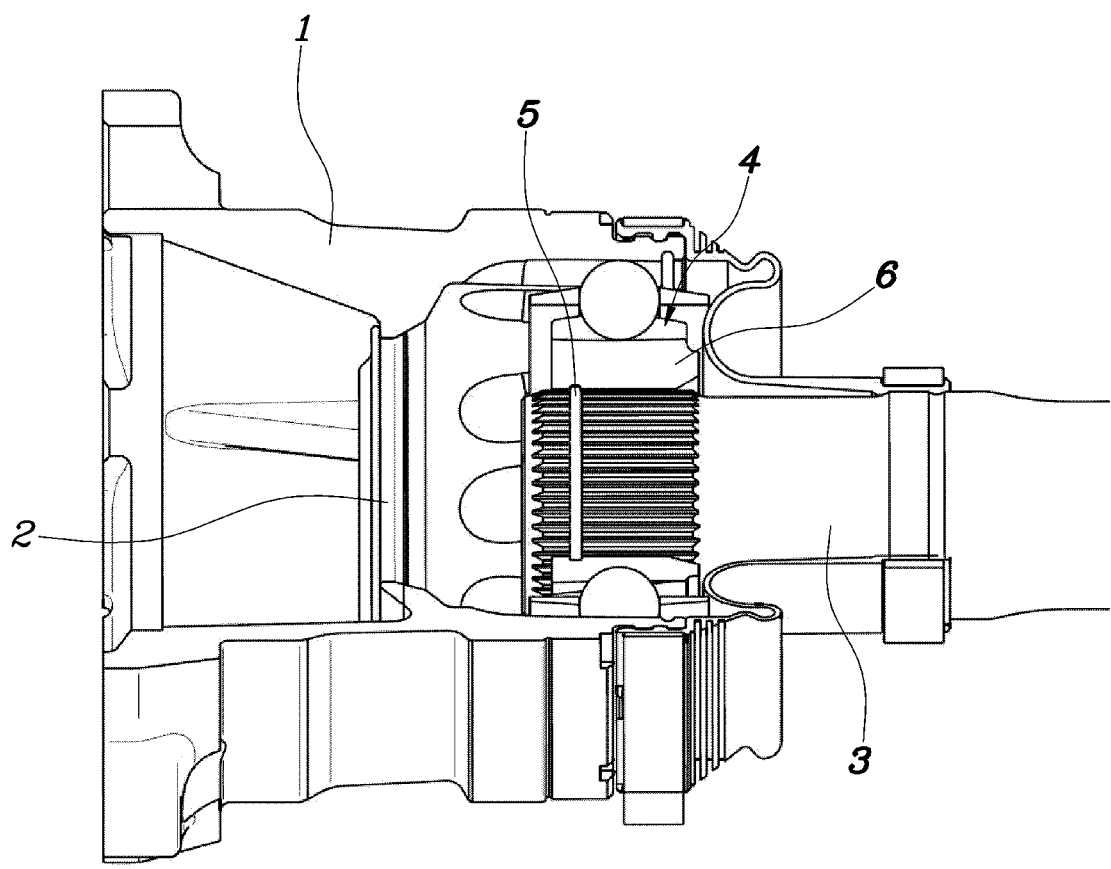
FIG. 4 is a view showing a wheel driving unit of the related art.

FIG. 1 is a view showing a wheel drive unit for a vehicle in one form of the present disclosure, and FIGS. 2 and 3 are views illustrating the wheel drive unit for a vehicle shown in FIG. 1. FIG. 4 is a view showing a wheel driving unit of the related art.

A wheel drive unit for a vehicle, as shown in FIGS. 1 and 2, includes: a connecting member 30 separably coupled to a constant velocity joint 10 and fixing a bearing 20 to the constant velocity joint 10 when the bearing 20 is mounted on the constant velocity joint 10; a hub housing 40 that forms an internal space where the constant velocity joint 10 is arranged and coupled with the hub housing 40 by the bearing 20; and a hub cap 50 which is separably disposed in the hub housing 40, seals the hub housing 40 when coupled to the hub housing 40, and allows the connecting member 30 to be removed from or mounted on the constant velocity joint 10 when the hub cap 50 is separated from the hub housing 40.

As described above, the constant velocity joint 10 and the hub housing 40 are connected through the bearing 20, and the bearing 20 is fixed by the connecting member 30 such that the bearing 20 does not axially move on the constant velocity joint 10. In one form, the connecting member 30 may be a circlip or a snap ring having holes 32 at both ends. When tools are inserted into the holes 32 and then the ends are forcibly opened, the diameter of the connecting member 30 is increased, so the connecting member 30 can be separated from the constant velocity joint 10. And, the connecting member 30 can be easily fitted on the constant velocity joint 10 and axial movement of the bearing 20 can be restricted by the connecting member 30.

In particular, a hub cap 50 is separably disposed inside the hub housing 40 in the present disclosure. Accordingly, when the hub cap 50 is coupled to the hub housing 40, the hub housing 40 is sealed, thereby forming a sealed structure that inhibits or prevents leakage of grease out of the constant velocity joint 10. Further, the connecting member 30 coupled to the constant velocity joint 10 can be removed from the hub housing 40 when the hub cap 50 is separated.

As illustrated in FIG. 4, in the related art, a hub housing 1 is sealed by a member 2 and the member 2 is integrated with the hub housing 1, so it cannot be separated. Further, a constant velocity joint 3 and a bearing 4 are coupled through a circlip 5, but the circlip 5 is fitted on the inner side of the inner race 6 of the bearing 4, so once the bearing 4 and the constant velocity joint 3 are coupled to each other by the circlip 5, separation of parts is difficult.

As described above, although parts are strongly coupled to each other in the related art, subsequent maintenance of the parts is not considered, so when a part is damaged, the entire device has to be replaced.

The present disclosure has been made to address this problem. The hub cap 50 is separably disposed inside the hub housing 40, so when the hub cap 50 is mounted inside the hub housing 40, leakage of grease and permeation of foreign substance are inhibited or prevented. Further, when the hub cap 50 is separated, the inside of the hub housing 40 is opened, so it is possible to put tools into the open inside and separate the connecting member 30 from the constant velocity joint 10.

The present disclosure is described in more detail hereafter. As shown in FIG. 3, a fixing groove 12 is formed around a first end of the constant velocity joint 10 and the connecting member 30 may be fitted in the fixing groove 12 in a ring shape.

Since the fixing groove 12 is formed at the first end of the constant velocity joint 10 and the connecting member 30 is fitted in the fixing groove 12, the connecting member 30 can be easily coupled and separated inside the hub housing 40.

Referring to FIG. 1, the constant velocity joint 10 is coupled through a second side of the hub housing 30 and the hub cap 50 is disposed at the center inside the hub housing 40. When the hub cap 50 is separated from the hub housing 40, the inside of the hub housing 40 is opened, so it is possible to put tools into the hub housing 40 through a first side of the hub housing 40 and separate the connecting member 30 from the constant velocity joint 10. Since the connecting member 30 is fitted in the fixing groove 12 formed at the first end of the constant velocity joint 10, it is possible to easily separate the connecting member 30 fitted on the first end of the constant velocity joint 10 in the hub housing 40.

Meanwhile, as shown in FIGS. 1 and 3, a bearing seat 14 on which the bearing 20 is mounted is formed at an end portion of the constant velocity joint 10, the fixing groove 12 is formed at a first end of the bearing seat 14, and fixing protrusions 16 are formed around a second end of the bearing seat 14, so the bearing 20 can be disposed and fixed between the connecting member 30 and the fixing protrusions 16.

The bearing seat 14 formed on the constant velocity joint 10 is composed of a plurality of teeth and the bearing 20 mounted on the bearing seat 14 also has teeth corresponding to the teeth of the bearing seat 14, so the bearing seat 14 and the bearing 20 can be engaged with each other. Accordingly, when the constant velocity joint 10 is rotated, the bearing 20 engaged with the bearing seat 14 can also be rotated.

In particular, the fixing groove 12 is formed at the first end of the bearing seat 14 and the fixing protrusions 16 are formed at the second end of the bearing seat 14. That is, the fixing groove 12 is circumferentially formed the first end of the bearing seat 14, so the connecting member 30 is fitted in the fixing groove 12. Further, the fixing protrusions 16 are arranged around the second end of the bearing seat 14, so the bearing 20 is disposed between the connecting member 30 and the fixing protrusions 16. Accordingly, axial movement of the bearing 20 is restricted.

In detail, the bearing 20 is composed of an inner race 22 fitted on the constant velocity joint 10, an outer race 24 fitted on the inner side of the hub housing 40, and balls 26 retained between the inner race 22 and the outer race 24, whereby the inner race 22 is disposed between the connecting member 30 and the fixing protrusions 16 and can be axially fixed on the constant velocity joint 10.

The bearing 20 may further include a cage 28 transmitting torque between the inner race 22 and the outer race 24, in addition to the inner race 22, outer race 24, and balls 26. The inner race 22 is disposed between the connecting member 30 and the fixing protrusions 16 and is not axially moved on the constant velocity joint 10, so power according to rotation of the constant velocity joint 10 can be smoothly transmitted to the hub housing 40 through the bearing 20.

The outer race 24, which is a part of the bearing 20, can be fitted in the hub housing 40, or the outer race 24 may be integrated with the hub housing 40, whereby the structure can be simplified.

On the other hand, as shown in FIG. 2, threads may be formed around the inner side of the hub housing 40 and threads corresponding to the threads may be formed on the outer side of the hub cap 50.

A straight fastening groove 52 may be formed on a side of the hub cap 50.

Since the threads are formed around the inner side of the hub housing 40 and the threads are formed on the outer side of the hub cap 50, the hub cap 50 may be thread-fastened or separated in the hub housing 40. When the hub cap 50 is thread-fastened to the hub housing 40, strong coupling and sealing are secured by the thread-coupling characteristic.

Since the fastening groove 52 is formed on a side of the hub cap 50, it is possible to turn the hub cap 50 by inserting a tool, such as a flathead screwdriver, into the fastening groove 52. Accordingly, the hub cap 50 can be coupled to or separated from the hub housing 40. The fastening groove 52 can be formed in various shapes that can be coupled to tools.

When a part of the wheel drive unit of the present disclosure is damaged or needs to be replaced, it is possible to open the hub housing 40 by removing the hub cap 50 from the hub housing 40 and then separate the connecting member from the constant velocity joint 10 by inserting tools into the open inside.

Further, the connecting member 30 is fitted on the first end of the constant velocity joint 10 and is positioned at the end of the bearing 20, so it is exposed. Accordingly, it is possible to separate the connecting member 30 and separate the constant velocity joint 10 and the hub housing 40 from each other by removing the exposed connecting member 30.

According to the drive wheel unit for a vehicle which has the structure described above, since the inside of the hub housing can be opened and closed as desired, the constant velocity joint 10 of the internal parts of the wheel drive unit can be separated if desired. As the constant velocity joint 10 can be replaced and repaired in this way, continuous maintenance is possible.

Although the present disclosure was provided above in relation to specific forms shown in the drawings, it is apparent to those skilled in the art that the present disclosure may be changed and modified in various ways without departing from the scope of the present disclosure.

What is claimed is:

1. A wheel drive unit for a vehicle, the wheel drive unit comprising:
    a connecting member separably coupled to a constant velocity joint and configured to fix a bearing to the constant velocity joint when mounted on the constant velocity joint;
    a hub housing forming an inner space where the constant velocity joint is arranged and coupled with the hub housing by the bearing; and
    a hub cap separably disposed in the hub housing, and configured to:
        seal the hub housing when coupled to the hub housing, and
        allow the connecting member to be separated from or mounted on the constant velocity joint when the hub cap is separated from the hub housing,
    wherein:
        a fixing groove is formed around a first end of the constant velocity joint,
        the connecting member is fitted in the fixing groove in a ring shape,
        the connecting member is a circlip or a snap ring having holes at both ends thereof,
        the bearing is fixedly mounted on a bearing seat except for the fixing groove formed around a first end of the bearing seat, and
        when the connecting member is fitted in the fixing groove, the connecting member is in contact with a side surface of an inner race of the bearing and configured to prevent an axial movement of the bearing.

2. The wheel drive unit of claim 1, wherein:
    the bearing seat is formed at an end portion of the constant velocity joint, and
    fixing protrusions are formed around a second end of the bearing seat, such that the bearing is disposed and fixed between the connecting member and the fixing protrusions.

3. The wheel drive unit of claim 2, wherein the inner race of the bearing is fitted on the constant velocity joint, and the bearing further includes: an outer race fitted on an inner side of the hub housing, and balls retained between the inner race and the outer race, and
    wherein the inner race is disposed between the connecting member and the fixing protrusions.

4. The wheel drive unit of claim 1, wherein first threads are formed around an inner side of the hub housing and second threads are formed on an outer side of the hub cap, and the first threads and the second threads mate with each other to seal the inner space.

5. The wheel drive unit of claim 1, wherein a straight fastening groove is formed on an outer surface of the hub cap.

6. A wheel drive unit for a vehicle, the wheel drive unit comprising:
    a connecting member separably coupled to a constant velocity joint and configured to limit an axial movement of a bearing mounted on the constant velocity joint;
    a hub housing forming an inner space where the constant velocity joint is arranged and coupled with the hub housing by the bearing; and
    a hub cap separably disposed in the hub housing, and configured to open or close the hub housing and allow the connecting member to be separated from or mounted on the constant velocity joint while maintaining coupling between the constant velocity joint and the bearing when the hub cap is separated from the hub housing,
    wherein:
    a bearing seat is formed around a circumferential surface of the constant velocity joint and the bearing is fixedly mounted on the bearing seat,
    a fixing groove is formed around a first end portion of the bearing seat and configured to receive the connecting member,
    the connecting member is a circlip or a snap ring having holes at both ends thereof,
    the bearing is fixedly mounted on the bearing seat except for the fixing groove, and
    when the connecting member is fitted in the fixing groove, the connecting member is in contact with a side surface of an inner race of the bearing and configured to prevent the axial movement of the bearing.

7. The wheel drive unit of claim 6, wherein fixing protrusions are formed around a second end portion of the bearing seat such that the bearing is disposed and fixed between the connecting member and the fixing protrusions.

\* \* \* \* \*